(12) United States Patent
Binnig (10) Patent No.: US 7,117,131 B2
(45) Date of Patent: Oct. 3, 2006

(54) METHOD FOR CHARACTERIZING A COMPLEX SYSTEM

(75) Inventor: Gerd Binnig, Wolferau (CH)

(73) Assignee: Definiens AG, Munich (DE)

( * ) Notice: Subject to any disclaimer, the term of this patent is extended or adjusted under 35 U.S.C. 154(b) by 797 days.

(21) Appl. No.: 09/850,928

(22) Filed: May 7, 2001

(65) Prior Publication Data

US 2002/0010710 A1    Jan. 24, 2002

Related U.S. Application Data

(63) Continuation-in-part of application No. 09/029,142, filed on May 26, 1998.

(51) Int. Cl.
*G06F 17/10* (2006.01)
*G06G 7/48* (2006.01)

(52) U.S. Cl. .............................. 703/2; 703/6
(58) Field of Classification Search .............. 703/2, 703/6
See application file for complete search history.

(56) References Cited

U.S. PATENT DOCUMENTS

| | | | | |
|---|---|---|---|---|
| 5,076,793 A | * | 12/1991 | Aghevli et al. | 434/196 |
| 5,343,554 A | * | 8/1994 | Koza et al. | 706/13 |
| 5,434,796 A | * | 7/1995 | Weininger | 703/12 |
| 5,649,192 A | * | 7/1997 | Stucky | 707/103 |
| 5,651,099 A | * | 7/1997 | Konsella | 706/13 |
| 5,699,268 A | * | 12/1997 | Schmidt | 702/27 |
| 5,724,252 A | * | 3/1998 | Iijima et al. | 702/29 |
| 5,774,632 A | * | 6/1998 | Kaske | 706/25 |
| 5,815,198 A | * | 9/1998 | Vachtsevanos et al. | 348/88 |

OTHER PUBLICATIONS

Chakraborty et al.; "A hierarchical fractal net for pattern classification"; IEEE Int. Conf. Neural Networks; pp. 127-131; Nov. 1995.*
Fraternali et al.; "An efficient mean solvation force model for use in Molecular dynamics simulations of proteins in aqueous solution"; J. Molec. Biol; vol. 256, #5; pp. 939-948.*

* cited by examiner

*Primary Examiner*—Hugh Jones
(74) *Attorney, Agent, or Firm*—Blakely Sokoloff Taylor & Zafman (57) ABSTRACT

Disclosed is a computer-implemented method for characterizing a complex system, wherein said complex system consists of a plurality of objects and wherein relations are present between said objects, said method comprising the steps of (a) forming a hierarchical structure having a plurality of hierarchical levels, wherein super ordinate objects of a respective higher hierarchical level of the hierarchical structure are combinations of objects of a respective lower hierarchical level of the hierarchical structure, wherein a characteristic and a boundary condition is assigned to each of said objects within the hierarchical structure; (b) forming groups of objects which belong to the same superordinate object of a respective higher hierarchical level; determining relations between objects in each respective group by taking into account the respective boundary conditions of the objects within the respective group; (d) determining at least one characteristic for each group based on the determined relations between objects within a respective group while taking into account the respective boundary conditions of the objects within the respective group in order to describe a superordinate object; (e) determining boundary conditions for each object of a respective group based on the characteristic of an superordinate object which represents the respective group; (f) modifying the objects in accordance with the determined characteristics and boundary conditions; and (g) iterative repeating steps (b) to (f) until a predetermined condition is met.

20 Claims, 7 Drawing Sheets

Recursion to another object on a same or different hierarchy level

METHOD FOR CHARACTERIZING A COMPLEX SYSTEM

CROSS REFERENCE TO RELATED APPLICATIONS

This application is a continuation-in-part of U.S. patent application Ser. No. 09/029,142, filed May 26, 1998.

FIELD OF THE INVENTION

The present invention relates to a computer-implemented method for characterizing a complex system, wherein said complex system consists of a plurality of objects and wherein relations are present between said objects.

DESCRIPTION OF THE PRIOR ART

A complex system may be viewed as a system in which a large number of objects may interact individually and as groups to affect the behavior of the remaining objects or groups. Examples of complex systems include the interaction between individual pixels in a picture such a as seen on a computer monitor, the neural interaction within the human brain, the interactions between human beings, the movement of gas particles, and automobile traffic.

In very complex systems the number of mutually linked, interactive or interdependent objects may be extremely large. For example, a picture of patterns may consist of at least one million pixels, each of which may be linked with its neighboring pixels. Each pixel may be viewed as an object, neighboring pixels may be grouped as an object, or the entire one million pixels may constitute a single object of the picture. In the case of neurons in the human brain, the number of directly or indirectly linked objects may be in the order of several billion neurons. Furthermore, where the network "humankind" is regarded as a multitude of billions of single humans who entertain relations of the most variegated manners, the number of directly or indirectly linked objects also may be in the order of several billions.

To address such complex systems, two approaches have been put forth: the statistical macroscopic approach and the object-oriented microscopic approach. In general, complex systems are mostly calculated "macroscopically", that is to say with the aid of statistical methods. In the other conventional method the so-called microscopic approach, each single object of the complex system is considered individually in that object's reciprocal effect with other objects. In a common situation, each individual object is considered with respect to all of the other objects.

Neural networks may be viewed as a network of impulse-conducting cells that constitute the brain, spinal column, and nerves, consisting of a nucleated cell body with one or more dendrites and a single axon. Neural networks are currently calculated mostly with the aid of the object-oriented microscopic method. This is usually achieved by initially recognizing as a network all possible connections from each neuron to every one of the other neurons. The resulting object-oriented network is trained in accordance with specific algorithms. However, during the training process, part of these artificial network connections are strengthened whereas other part is weakened.

Presently, it is not possible to calculate genuine complex neural networks with either of the above approaches. The principal reason for this is that the number "W" of interactions increases approximately by the square of the number "N" of objects such that $W=(N-1) \times N$. For example, approximately $10^{20}$ interactions would have to be calculated for $10^{10}$ neurons. Calculating approximately $10^{20}$ interactions is presently impossible within an acceptable period of time, even with current high-performance computers.

Another complex system example is a traffic simulation. Traffic simulation experiments have been performed through microscopic calculation by individually examining each single vehicle in its interactions with the neighboring vehicles and with the road. Statistical macroscopic methods have also been used. Similar to the examination of gases, the individual movement of the single vehicle object is not considered in detail.

Quite generally, it can be said that the microscopic approach only permits to process relative small systems whereas the statistical approach suffers from the disadvantage that only rough, global statements are possible. Statistical methods can nevertheless be employed very successfully for describing so-called macroscopic properties. For example, statistical methods may condense a large number of data into a few essential data. In other words, the statistical description of the movements of atoms, molecules, vehicles in traffic, for example, results in the known equations that make, in the example of a gas system, mathematical statements concerning pressure, temperature, density and flow velocity. Corresponding statements concerning flow and density in traffic may also be made. However, since statistical methods do not fully take into account the interlaced structure of complex systems, essential information is lost. Thus, statistical methods are not suited for giving statements concerning complicated interdependencies. This is one reason why statistical statements concerning the movements of the atoms in living organisms hardly provide any insight into the manner of functioning of the organisms. Furthermore, the actual traffic taking place in a town or city cannot be described in a statistical manner for similar reasons. In short, none of the hitherto known methods, and in particular the microscopic and macroscopic approaches are capable of characterizing, i.e., calculating, analyzing or recognizing, complex systems with sufficient accuracy in a reasonable amount of time.

SUMMARY OF THE INVENTION

In accordance with an aspect of the present invention there is provided a computer-implemented method for characterizing a complex system, wherein said complex system consists of a plurality of objects and wherein relations are present between said objects, said method comprising the steps of (a) forming a hierarchical structure having a plurality of hierarchical levels, wherein superordinate objects of a respective higher hierarchical level of the hierarchical structure are combinations of objects of a respective lower hierarchical level of the hierarchical structure, wherein a characteristic and a boundary condition is assigned to each of said objects within the hierarchical structure; (b) forming groups of objects which belong to the same superordinate object of a respective higher hierarchical level; (c) determining relations between objects in each respective group by taking into account the respective boundary conditions of the objects within the respective group; (d) determining at least one characteristic for each group based on the determined relations between objects within a respective group while taking into account the respective boundary conditions of the objects within the respective group in order to describe a superordinate object; (e) determining boundary conditions for each object of a respective group based on the characteristic of an superordinate object which represents the respective group; (f) modifying the objects in accordance with the determined characteristics and boundary conditions; and (g) iterative repeating steps (b) to (f) until a predetermined condition is met.

In a preferred embodiment of the present invention the highest hierarchical level of the hierarchical structure is represented by a single object.

In a further preferred embodiment of the present invention in forming the hierarchical structure an algorithm is used.

In a further preferred embodiment of the present invention the algorithm is a fractal algorithm and is employed in a similar manner for all objects within the hierarchical structure.

In a further preferred embodiment of the present invention determining at least one characteristic for each group is based on a rising order of hierarchy level while proceeding on a fractal manner.

In a further preferred embodiment of the present invention determining at least one characteristic for each group includes calculating according to a fractal algorithm.

In a further preferred embodiment of the present invention determining boundary conditions for each object of a respective group includes determining in a descending order of hierarchy level while proceeding in a fractal manner.

In a further preferred embodiment of the present invention proceeding in a fractal manner includes splitting in accordance with fractal algorithms, wherein splitting in accordance with fractal algorithms includes at least one of classifying into sub-topics, classifying into more specific boundary conditions, splitting resources and distributing resources.

In a further preferred embodiment of the present invention determining at least one characteristic for each group is performed before determining boundary conditions for each object of a respective group.

In a further preferred embodiment of the present invention determining at least one characteristic of each group is performed after determining boundary conditions for each object of a respective group.

In a further preferred embodiment of the present invention determining relations between objects in a respective group, determining at least one characteristic for each group and calculating boundary conditions for each object of a respective group are each performed according to an algorithm, wherein each algorithm includes factors of neighboring objects, subordinate objects and boundary relations.

In a further preferred embodiment of the present invention each algorithm modifies respective objects based on at least one of the current status, the neighboring objects, the context and the subordinate objects.

In a further preferred embodiment of the present invention the method further comprises the step of performing object recognition having the form of a self-optimizing simulation.

In a further preferred embodiment of the present invention performing object recognition includes employing a fractal-hierarchical library.

In a further preferred embodiment of the present invention each characteristic is classified into one of an internal characteristic and an external characteristic and wherein each boundary condition is classified into one of a internal boundary condition and an external boundary condition.

In a further preferred embodiment of the present invention the internal characteristics are determined in an internal context from internal relations of the subordinate objects with their characteristics.

In a further preferred embodiment of the present invention the internal context constitutes the boundary condition for the internal relations of the subordinate object and is determined from an external context of the objects and their external characteristics.

In a further preferred embodiment of the present invention the external characteristics are calculated by bunching in the external context.

In a further preferred embodiment of the present invention the external context constitutes the boundary condition for determining the external characteristic and is calculated from internal relations of the superordinate object and its internal context.

In a further preferred embodiment of the present invention the complex system is a satellite picture.

BRIEF DESCRIPTION OF THE DRAWINGS

These and other aspects of the present invention will be apparent from and elucidated with reference to the embodiments described hereinafter and considered in connection with the accompanying drawings, in which.

DETAILED DESCRIPTION OF THE INVENTION

An embodiment of the invention may simplistically be termed a "fractal-hierarchical (f-h) bunching" or "statistics with fractal-hierarchical boundary conditions". A benefit resides in that this method may be applicable to any type of complex systems, including fields of applications such as technology, sociology, psychology, ecology, economy, biology, chemistry, and physics. As is obvious from the following description there will be described an example in which the invention is applied on a satellite picture.

An embodiment of the invention may be thought of as a compromise between the "microscopic" and "macroscopic" descriptions of very large complex systems. In a simple system, such as a container filled with inert gas atoms, a particular grouping of atoms cannot be detected. However, since the interactions in complex systems are not homogeneous, grouping steps, thus also "bunching" steps, can actually be performed.

Proteins may be viewed as any of a group of complex organic macromolecules that may contain carbon, hydrogen, oxygen, nitrogen, and usually sulfur and may be composed of one or more chains of amino acids. Proteins are fundamental components of all living cells and include many substances, such as enzymes, hormones, and antibodies, that are necessary for the proper functioning of an organism. In living organisms, the atoms of living organisms may be grouped in functional units such as the protein molecules. This grouping may exhibit a hierarchical structure since the present function of the molecules are only partial or particular functions that are included in a more universal function or functions. Moreover it may be possible to find groupings of atoms that represent sub-functions within the protein molecule group.

Bunching may be a process that takes place on various hierarchical levels in an interlacing manner. In complex contexts, it may be possible to observe a staggered bunching into ever new function on a larger scale. To this end, a first aspect of the present invention is to measure the partly processing of such systems by employing fractal algorithms.

A complex system may be represented by a progressive classification, by at least one of size, amount, importance, and rank. Methods and algorithms which may be employed for describing a system having such levels (on a small scale as well as on a large scale) may be referred to as fractal methods and fractal algorithms. A fractal may be thought of as a rough or fragmented geometric shape that can be subdivided in parts, each of which is (at least approximately) a smaller copy of the whole. Fractals may be generally self-similar (bits look like the whole) and independent of scale (they look similar, no matter how close you zoom in). Many mathematical structures are fractals, e.g. Sierpinski triangle, Koch snowflake, Peano curve, Mandelbrot set, and Lorenz attractor. Fractals may also be used to describe many real-world objects that do not have simple geometric shapes, such as clouds, mountains, turbulence, and coastlines.

Fractal methods conventionally have not been treated on in particular because in connection with fractals, previous manners of proceeding were limited to those which may be comprehended in the strictly mathematical sense. Fractal algorithms are, however, very well definable mathematically. As noted above, applications of fractal algorithms have been limited to geometrical structures in space, such as a coastline or cloud, or in time, such as stock prices. A second aspect of the present invention thus resides in the insight that processes and interactions can also be represented with the aid of fractal algorithms. The fractal algorithms herein do not have to be precisely identical but need only be similar.

Figure 1:
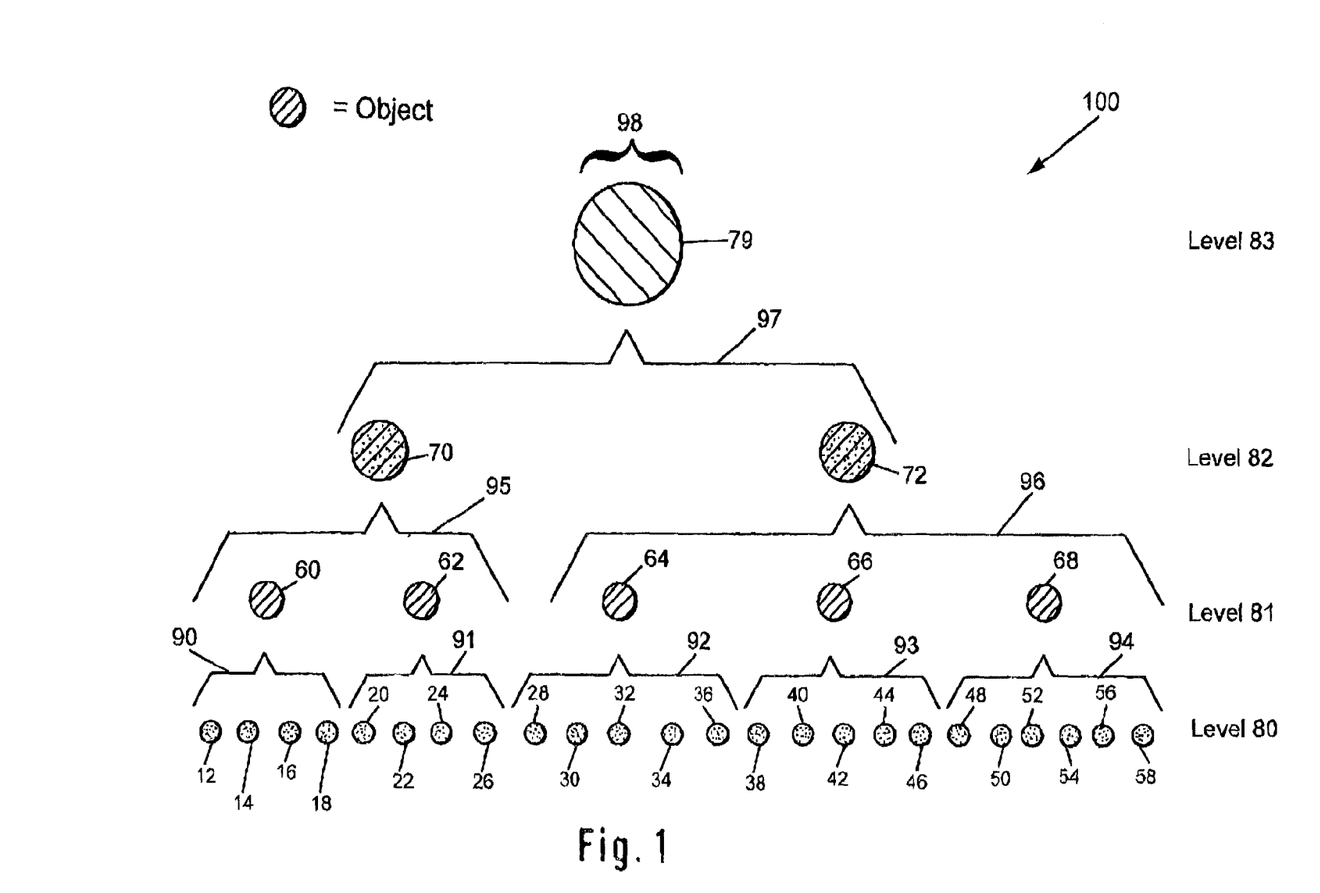
FIG. 1 illustrates hierarchical classification.

FIG. 1 illustrates hierarchical classification. In FIG. 1, a level of objects is arranged into hierarchy 100 as both groups and additional objects. Initially, objects within level 80 of FIG. 1 may be presented as a complex system that is to be evaluated. For example, each object in level 80 may be a neuron within the human brain, where the human brain represents the complex system. As noted more fully below, the object within level 83 of FIG. 1 may be presented initially as the complex system that is to be evaluated. For example, the object in level 83 may be a satellite picture where the complex system is the details of the satellite picture.

In the example shown in FIG. 1, level 80 includes twenty four objects, labeled object 12 through object 58. The objects within level 80 preferably include all relevant microscopic objects. The number of objects within level 80 is assumed to equal n80. Thus, in the example shown in FIG. 1, n80=24. The number of objects within level 80 may be more than twenty-four. For example, in the case of neurons in the human brain, the number of objects may be in the order of several billion neurons. In such an example, the number of objects within level 80 would be several billion (n80=several billion).

To arrange the objects in level 80 into hierarchy 100 as both groups and additional objects, an embodiment of the invention forms at least level 81, level 82, and then level 83. To form level 81, the objects within level 80 may be placed into groups 90, 91, 92, 93, and 94. Each of object within a group may include characteristics that are similar to the predetermined characteristics associated with those objects to be placed in a particular group. Each set of these grouped objects may then characterized as a new object.

For example, objects 12, 14, 16, and 18 of level 80 are placed within group 90 of level 80 to form object 60. Each of object 12, 14, 16, and 18 includes characteristics that were similar to the predetermined characteristics associated with those objects to be placed in group 90. Object 60 may then be arranged as part of level 81. Objects 62, 64, 66, and 68 similarly may be arranged into level 81. In the example of FIG. 1, there are five level 81 objects. With n81 representing the number of objects in level 81, n81=5 in this example.

The objects within level 80 may be placed into particular groups by suitably grouping several objects within level 80 so as to form level 81. At least one of (i) an initial characteristic for each of the objects in level 80 and (ii) an initial boundary condition for each group in level 80 may be predetermined as a heuristic technique. Thus, depending on the relevance of relations, i.e., interactions and intensity of the interactions, between objects n81 groups are formed.

In connection with the activities described for levels 81, 82, and 83, as well as the level 80 objects within group 62, 64, 66 and 68, suitably grouping several objects within level 80 constitutes a fractal manner of proceeding inasmuch as the grouping takes place in a similar manner on different levels. The objects within level 80 may be divided or separated at will. However, in most cases, the objects within level 80 preferably are divided or separate by employing a suitable algorithm. Since fractal algorithms are very well definable mathematically, a suitable algorithm would be one that is similar for each level of tree structure or hierarchy 100 or one, that is a specific algorithm. A specific algorithm may be a fractal that may be employed in a similar manner to generate each group of each level in hierarchy 100.

To form level 82, the objects within level 81 may be grouped as objects, where the grouped objects are identified as a new object. For example, objects 60 and 62 of level 81 in FIG. 1 are grouped as object 70. Object 70 may then be arranged as part of level 82. In general, the n81 objects of level 81 may be grouped in accordance with their relations, i.e., interactions, on level 81 and result in n82 objects on level 82.

The equivalent process may be repeated analogously for the remaining levels of hierarchy 10 until the highest hierarchical level having one object is obtained. In the case of FIG. 1, level 83 is the top level of hierarchy 10 and contains object 74 as shown. The number of levels is not limited to four. Depending on the complex system being analyzed and the degree or number of the relations, i.e., interactions or dependencies in this complex structure, the number of levels may be significant (as well as the number of objects on each level). For example, where n80=several billion for level 80 as in the case of neurons in the human brain, the number of levels may be significantly greater than four levels.

With the level of objects arranged into hierarchy 10 as additional objects, there will be a plurality of hierarchy levels that including n80+n81+n82+ . . . nn number of objects. The number of objects within a group on level 80 may be identified as m80$i$. The number of objects with a particular group is usually much smaller than the total number of objects in that same level. For example, group 90 of level 80 contains four objects, here objects 12, 14, 16, and 18 (m8090=4) The total number of objects in level 80 is twenty-four (n80=24). Thus, m80$i$ is less than n80. In an extreme case, m80$i$ will equal one for some groups.

Rather than arranging objects into hierarchy 10 by starting out at the bottom level, here level 80, it is also possible to have the described process unfold in reverse order, namely from top to bottom. In this case, object 74 of level 3 may be split into objects that form group 97 of level 82. The objects of level 82 themselves may be split into groups for the lower levels until the lowest level is formed. In this alternate embodiment, level 83 would represent the complex system to be calculated. An example of such a complex system would be a satellite photograph object where each pixel and group of pixels of the satellite photograph object are arranged on lower levels.

Figure 2:
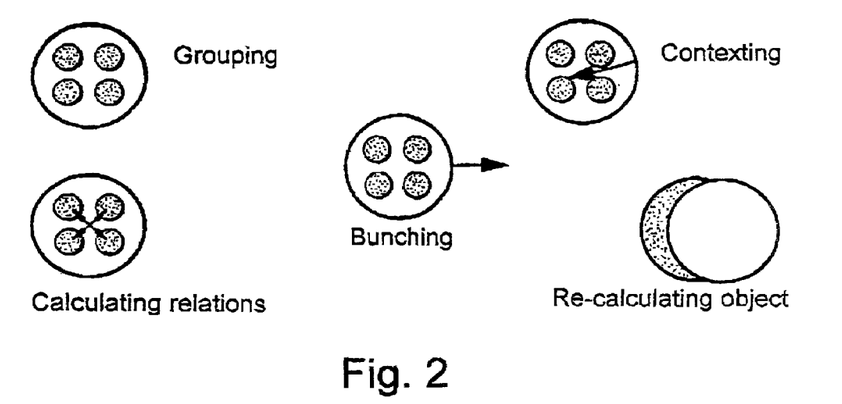
FIG. 2 illustrates the symbols used in connection with FIG. 3 and FIG. 4.
Figure 3:
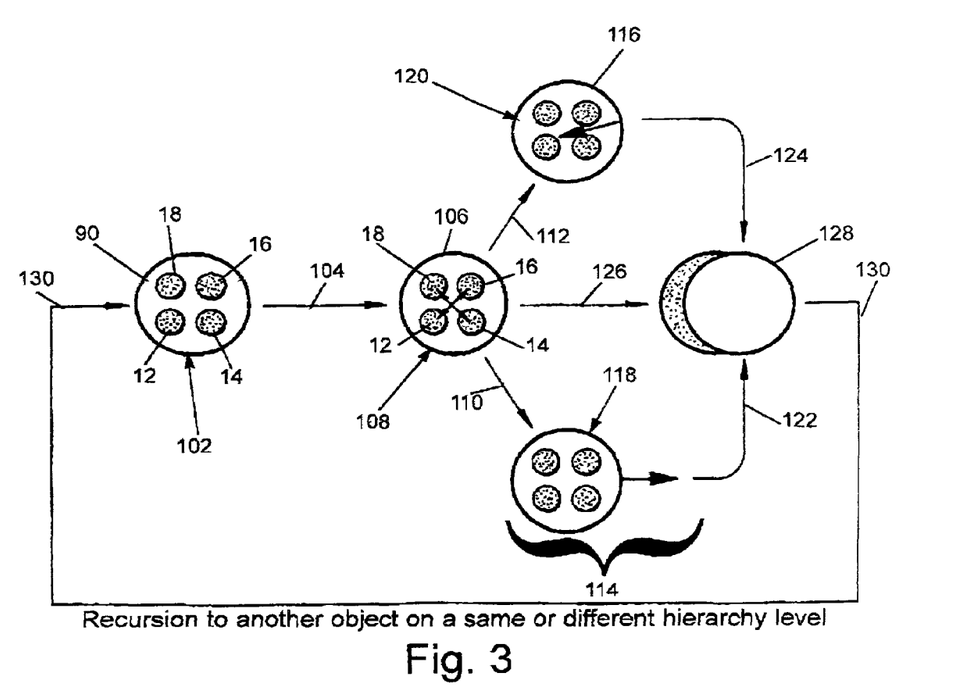
FIG. 3 illustrates process 100 that may be used to recognize each group of objects within a complex system.
Figure 4:
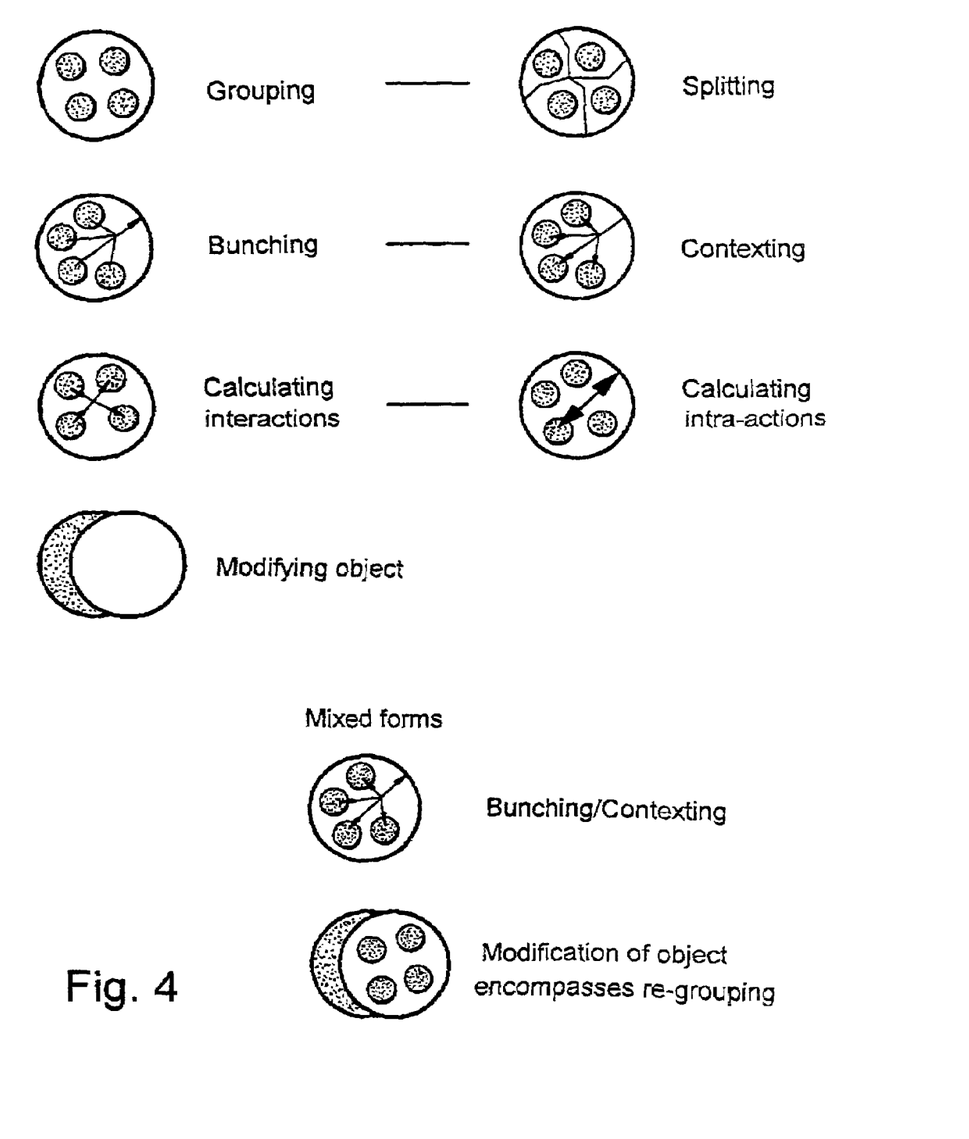
FIG. 4 illustrates the fractal-hierarchical recursion (f-h recursion) symbols used in connection with FIG. 5 and FIG. 6.

FIG. 2 illustrates the symbols used in connection with FIG. 3 and FIG. 4. FIG. 3 illustrates a process that may be used to recognize each group of objects within a complex system. The Process may involve grouping, calculating relations, bunching, and contexting as discussed below. Recursive re-calculating may be used as part of the process for more accurate results.

For the example illustrated in the process of FIG. 3, level 80 of FIG. 1 is used as the complex system. As discussed in connection with FIG. 1, the objects of level 80 were arranged into groups, each of which formed new objects on a new level, here level 81. The process was repeated until level 83 was formed, such that the were eight groups of objects disposed on four levels as associated with the complex system of FIG. 1, namely groups 90, 91, 92, 93, 94, 95, 96, and 97 on levels 80, 81, 82, and 83.

The Process of FIG. 3 may start out by forming groups 90, 91, 92, 93, 94, 95, 96, and 97 at step 102 of FIG. 3 and as discussed in connection with FIG. 1. The Process of FIG. 3 may then proceed to evaluate any one of groups 90, 91, 92, 93, 94, 95, 25 96, and 97 at step 104. For this example, group 90 (e.g. object 60) of FIG. 1 will be used. As illustrated in FIG. 3, group 90 includes objects 12, 14, 16, and 18. Each of object 12, 14, 16, and 18 includes characteristics that were similar to the predetermined characteristics associated with those objects to be placed in group 90.

After proceeding to evaluate step 104, relations, i.e., interactions 106, among objects 12, 14, 16, and 18 may be calculated at step 108. Interactions 106 may include the reciprocal effects, interdependencies, and boundary conditions for the objects within a group. Interactions 106 among the objects of each of the remaining groups in the complex system are then calculated at step 108.

Recall that the number of objects within a group on level 80 may be identified as m80$i$ and that the total number of objects in level 80 may be identified as n80. Since there may only be m80$i$*(m80$i$-l) interactions 106 in any given group, the total number of interactions 106 within hierarchical classified complex system is considerably less than the total number of interactions in a complex system that is not classified into a hierarchy (here n80*(n80-l)). As a result of hierarchical classification such as in step 102 of FIG. 3, interactions 106 of a complex system can be calculated within an acceptable period of time, even for large, complex systems.

The process of FIG. 3 next may proceed to both steps 110 and 112 to evaluate both the internal calculated interactions 106 among the objects of each group (bunching 114) and the external boundary conditions that contain the objects within its respective group (contexting 116). In most cases, it will not be very important whether process 100 starts with fractal bunching 114 or fractal contexting 116. This will mostly depend on whether the boundary conditions for bunching 114 or the characteristics for contexting 116 are known better.

If information is lacking on the highest or on the lowest hierarchy level, the process of FIG. 3 may begin either bunching 114 or contexting 116 on an intervening hierarchy level by either determining the approximate characteristics of the subordinate objects from the next lower hierarchy level or obtaining estimated or approximated boundary conditions from the immediately next higher hierarchy level. Through recursion 126, initial errors which have manifested, may be eliminated.

To evaluate the internal calculated interactions among the objects of each group at step 118, the process of FIG. 3 identifies at least one calculated interaction associated with a particular group that is relevant to the next hierarchy level. Preferably, this calculated interaction best describes the superordinate object that represents the objects of the subordinate group. In the present example, the invention would employ a calculated interaction 106 that best describes the superordinate object 60 of FIG. 1 that represents objects 12, 14, 16, and 18 of subordinate group 90. Such abstraction or extraction may be referred to as bundling or bunching 114 in the terminology of the present invention.

As a rule, the overall behavior of a group having objects is easier to describe than the sum of all interactions of its objects. Often, specific behaviors of the overall behavior of a group will be describable through some few statistical characteristic values, For example, this may be a number, the mean value of one or several characteristics, or a function. Alternatively, instead of purely statistical bunching methods, additional methods may be employed. For example, the varying interactions of many objects having specific functions may result in a new objects having a new overall function which can be described in a more simple manner than the sum of all single functions.

One example (from among extraordinarily many) are the known operational amplifiers whose functions or effects can be described by means of few characteristic numbers, whereas their respective constitution from subordinate objects generally is relatively complex.

Bunching 114 must be selected such as to represent a relevant characteristic of the group. The bunching process is repeated on each level at step 118, with the preferred direction of proceeding in the hierarchy being from bottom to top, i.e. from a small scale to a respective larger scale. This is a fractal manner of proceeding wherein the algorithm employed for bunching 114 may in addition be a fractal one.

To evaluate the external boundary conditions that contain the objects within its respective group (step 116), the process of FIG. 3 may calculate the individual boundary conditions for each object of a group. This calculation may be based on previously calculated characteristics of superordinate or higher level objects. As the characteristics or properties of higher level objects, these characteristics represent broader or more universal proposition than the propositions represented by the particular properties of subordinate level objects. In this respect, the characteristics of the higher level objects restrict the characteristics of the lower level objects to a particular context. Since the characteristics of the lower level objects may be based on the set of circumstances that surround the characteristics of higher level objects, the process of calculating boundary conditions for each object of a group is referred to as contexting 116 in the terminology of the present invention.

In conformity with the above explanations, the properties of the objects (or groups) may be calculated by staggered statistical bunching from bottom to top. The overall system (i.e. the object on the top level) generally may be contained within a particular context or interrelationship and will have to comply with specific boundary conditions (such as e.g. the totality of available resources). For example, where the human brain represents the complex system, the human brain itself must comply with specific boundary conditions.

Since the objects of one level are embedded in objects of the next or higher level, the objects in the next level represent the context of their subordinate objects. In other words, subordinate grouped objects are provided with their boundary conditions from "above". For example, subordinate grouped objects 90 of FIG. 1 are provided with their boundary conditions from group 60. Determination of the boundary conditions through contexting 116 may be performed in a similar fashion as that of bunching 114. However, contexting 116 is performed in reverse order from bunching 114.

Rather than using statistical bunching, contexting 116 may involve splitting a pre-established boundary condition into increasingly specific boundary conditions. Alternatively, contexting 106 may be performed by splitting or distributing resources, Splitting may be done in accordance with a fractal algorithm. Similar to bunching 114, the manner of splitting herein mostly depends on the interactions within a group. For contexting 116, just as in bunching 114, the remaining of the hierarchy levels (or scales) are then processed in a fractal manner. In contexting 116, movement through the hierarchy levels preferably is performed from top to bottom.

In connection with the previously described steps, composite forms of fractal contexting and bunching are equally possible. Furthermore composite forms of hierarchical classification and of fractal bunching 114 or contexting 116, respectively, are possible. For example, if an essential characteristic of objects on one level is that they are each composed of the same subordinate objects, with this composition not being predetermined, then the essential characteristic, too, must be calculated as a bunched characteristic. In this case, grouping within hierarchy 100 and bunching 114 may be regarded one process. Contexting 116 may equally encompass splitting into groups.

After bunching 118 and contenting 120, process 100 may proceed to steps 122 and 124, respectively. Steps 122, 124, and 126 lead to re-calculating object 128 as part of recursive step 130. Recursive step may lead to grouping (or splitting) 102.

In general to the process of FIG. 3, the respective order in processing objects and in employing formalisms is not so important. Due to recursion 130, each formalism is applied several times to each object. This is expressed by corresponding composite forms. However, depending on the particular complex system, some processing orders will be somewhat more meaningful than other ones.

Definition of hierarchy levels will not always be possible as simply as in the above description. For example, where there are multiple occurrence of some of the objects or groups in various contexts, it may be necessary to allocate fractions of the multiple occurring item based on its relevance with the context. As another example, if some of the groups are classified into more hierarchy levels or less hierarchy levels than their neighbor groups, a hierarchy level approach may not be possible. If two companies are subsidiaries of the same corporate group, where the corporate group is located on hierarchy level 6, it is possible for the first company to be located on level 4, 5, and 6 and the second company to be located on level 4 and 6 only, even though both companies are of similar sizes.

Figure 5:
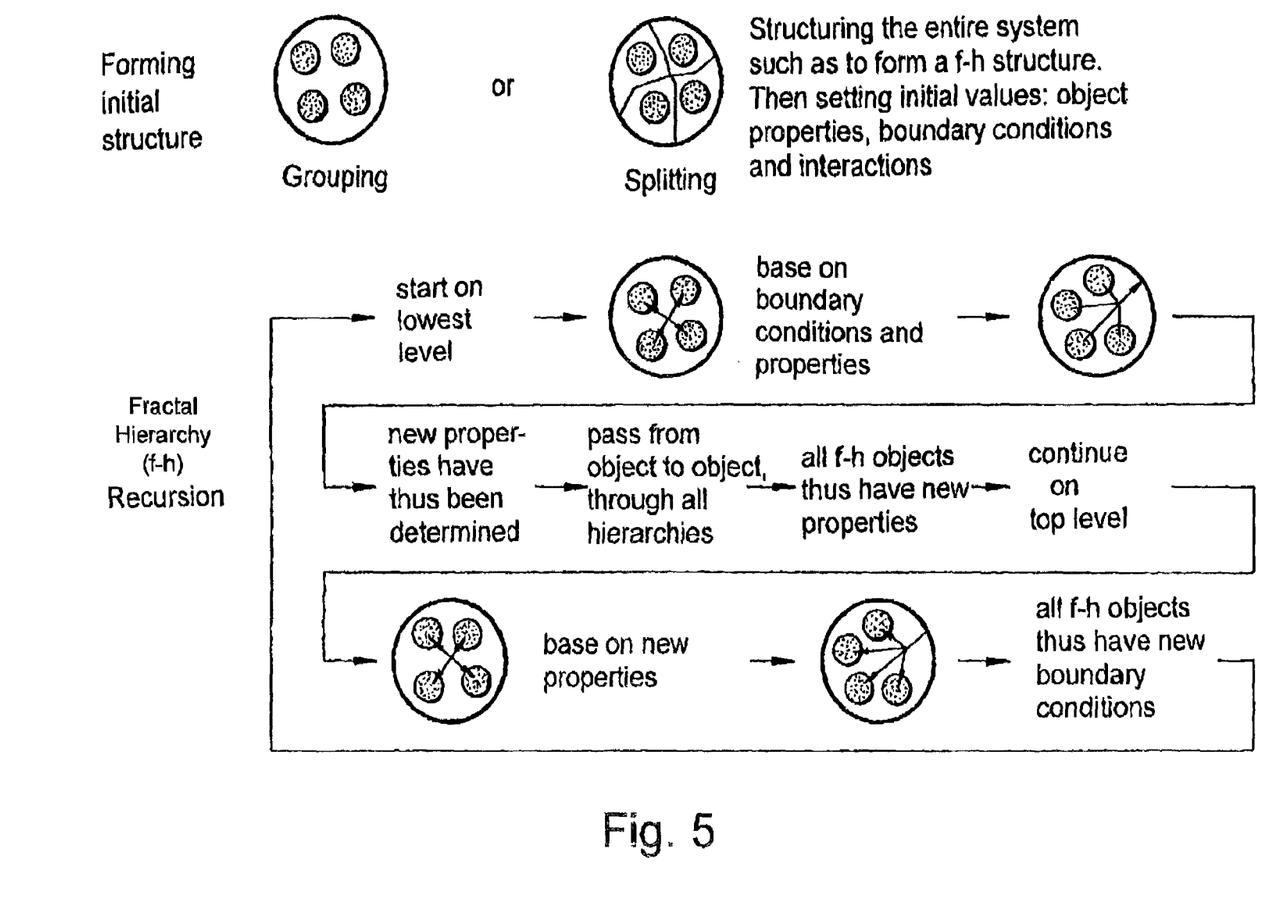
FIG. 5 illustrates fractal-hierarchical recursion.
Figure 6:
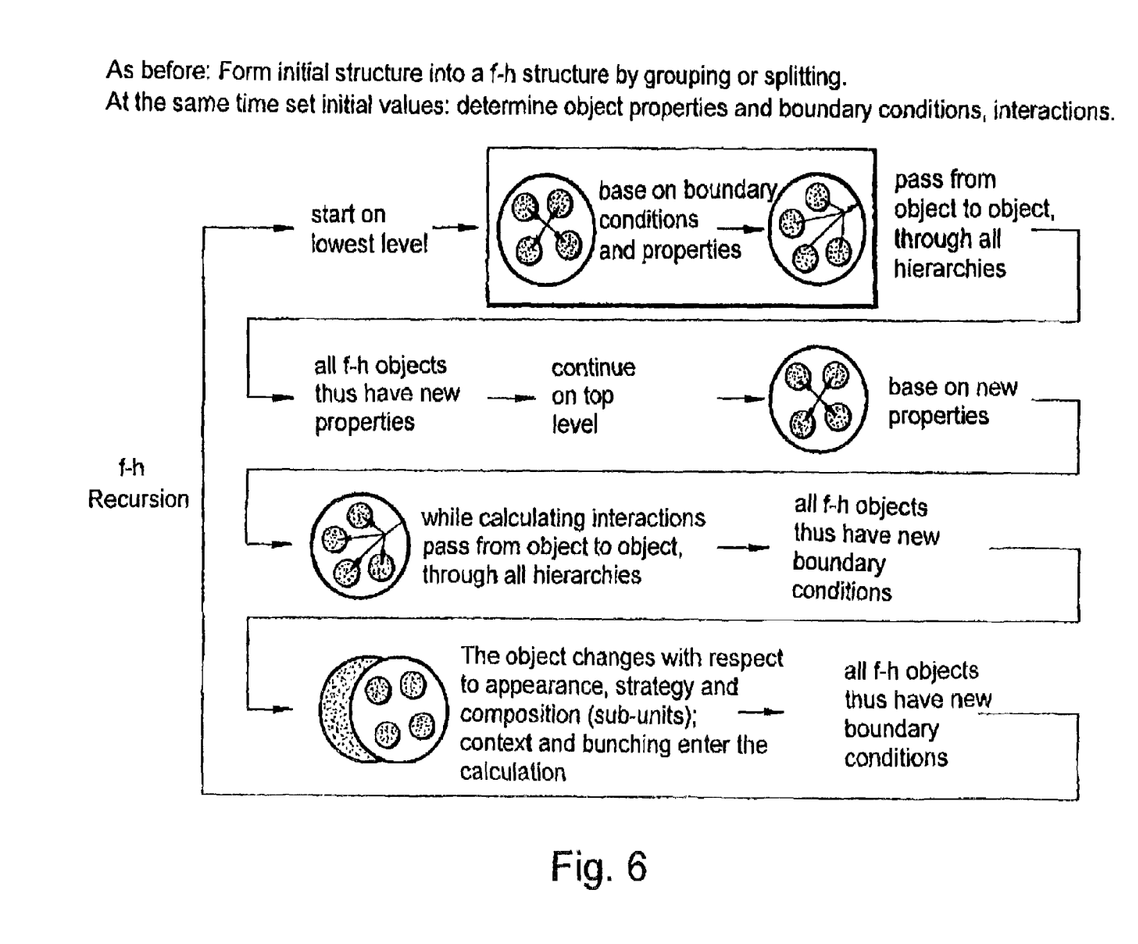
FIG. 6 illustrates an alternate embodiment to the fractal-hierarchical recursion of FIG. 5.
Figure 7:
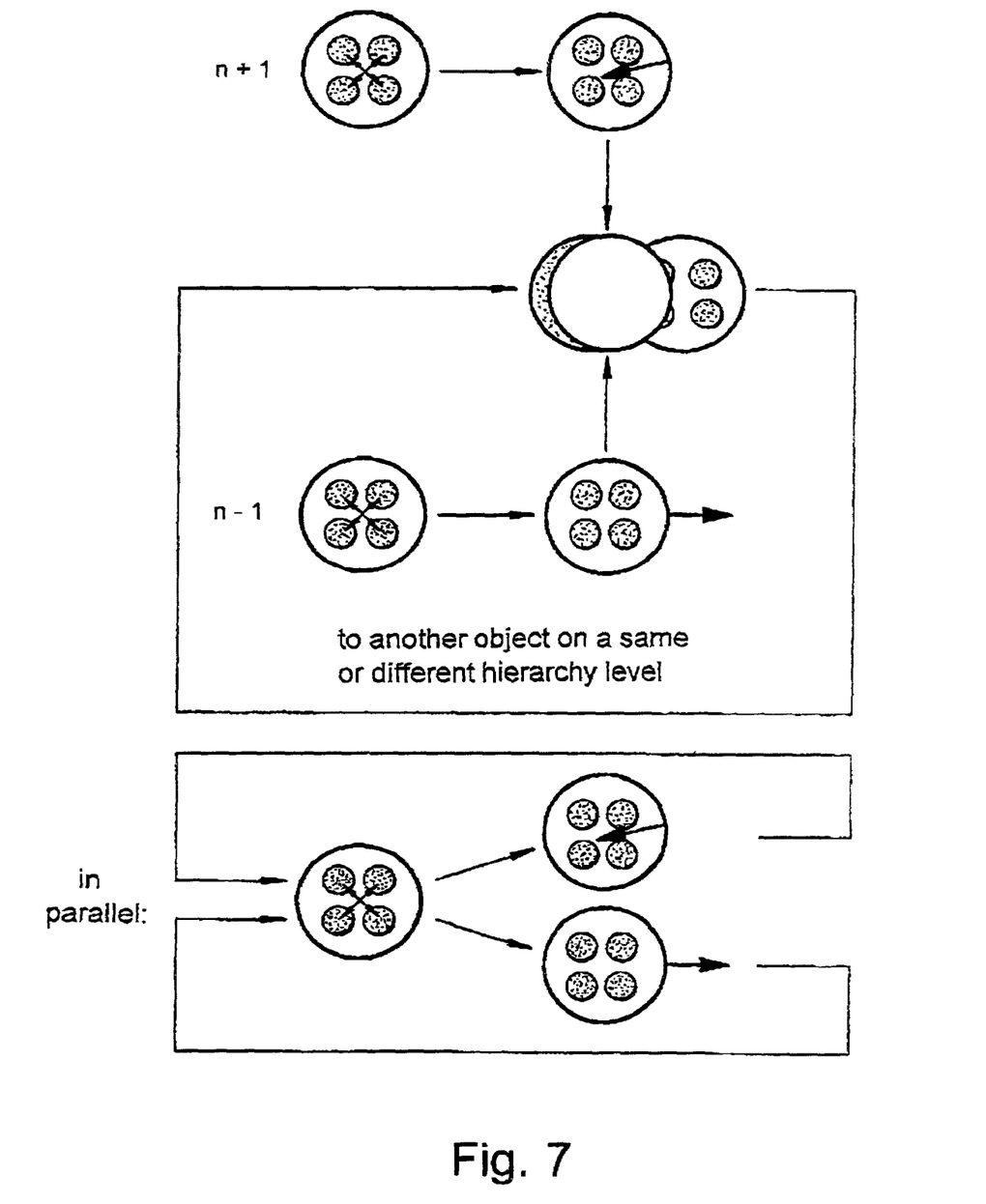
FIG. 7 illustrates an alternate embodiment to process 100 of FIG. 3.

As noted above, the process of FIG. 3 may involve grouping, calculating relations, bunching, and contexting. Recursive re-calculating also may be used as part of the process of FIG. 3 for more accurate results. FIG. 4 illustrates the fractal-hierarchical recursion (f-h recursion) symbols used in connection with FIG. 5 and FIG. 6. FIG. 7 illustrates an alternate embodiment to the process of FIG. 3. Because FIGS. 5, 6, and 7 are essentially self-explanatory, their further explanation is 5 omitted.

In the method according to the invention, all of the more important ones of the objects are to be calculated with respect to their effect and/or their development. To this end one does, however, require the context of the object and the characteristics of its subordinate objects. Because, however, in the absence of information on the respective object neither the context-object, i.e., the superordinate object, nor the subordinate objects can be calculated, this is a typical "hen-and-egg" problem. This problem may be solved in accordance with the invention by determining an initial configuration as a heuristic technique and by subsequent fractal-hierarchical recursion, with the objects and thus the contexts, i.e., the boundary conditions, and characteristics successively changing from iteration to iteration.

Initial structure: as a rule one will start with a first rough fractal-hierarchical grouping, with all of the objects being allocated initial characteristics and boundary conditions. The initial grouping may be performed at will or with the aid of conventional groupings or splitting methods, wherein it is, however, in turn possible to group the groups or divide the parts The initial characteristics and initial boundary conditions may equally be determined either at will or by conventional methods from the specific initial grouping. Subsequently the actual calculation of the system begins. All fractal-hierarchical objects are modified with the aid of algorithms which additionally include the neighboring objects, the subordinate objects and the boundary conditions of the objects. In this context it is e.g. possible to employ planning, multiplication, mutation, deformation, grouping, or other algorithms which modify the respective objects based on the current status, the neighboring objects, the context and/or the subordinate objects. It should be noted that a mutation algorithm is an algorithm which may address sudden variation in an object from its previous characteristics. This may be distinguished from gradual variation in which new characteristics become fully developed only in the course of many iterations of the method of the invention.

Following this calculation the neighboring objects, their subordinate objects and their boundary conditions for the respective objects have changed. Under these changed circumstances the objects are again calculated. This process is repeated recursively. The order of processing the hierarchical objects and employing the various method steps (such as e.g. bunching) depends on the problem in question. The various hierarchy levels may be processed a different number of times. As a rule, large objects (or superordinate objects) will not be treated as often as smaller (or subordinate) objects. In many cases not only the development of a particular system with the aid of predetermined algorithms will be of interest; rather very often an optimization of a particular system or of all (or some) objects of the system in accordance with specific criteria will be desirable. In object recognition this will even be true in every case because the rate of recognition should be maximum.

In the case of simulations, on the other hand, it is desired to maximize or minimize only certain parameters such as e.g. the turnovers or profits of a company or noxious substances in the environment. In other cases, more complex functions or processes are to be performed in a best possible manner. In this case it is the best possible adaptation to a "fractal-hierarchical" network of parameters. This is particularly true in object recognition in complex contexts. Fundamentally, object recognition proceeds like a self-optimizing simulation. What is required for this purpose is a fractal-hierarchical library to which the objects of the recognition method try to adapt. For optimization purposes, genetic or evolutionary algorithms may be employed which are possibly fractal if different hierarchies are employed.

In many cases the possibility of interactive intervention by humans will be of importance. For example if one is not content with the development of a simulation, one will often only wish to see how critical the reaction of the simulation to the modification of parameters This means that the progress of the simulation is continually represented while there is the option of stopping the simulation for intervention.

Figure 8:
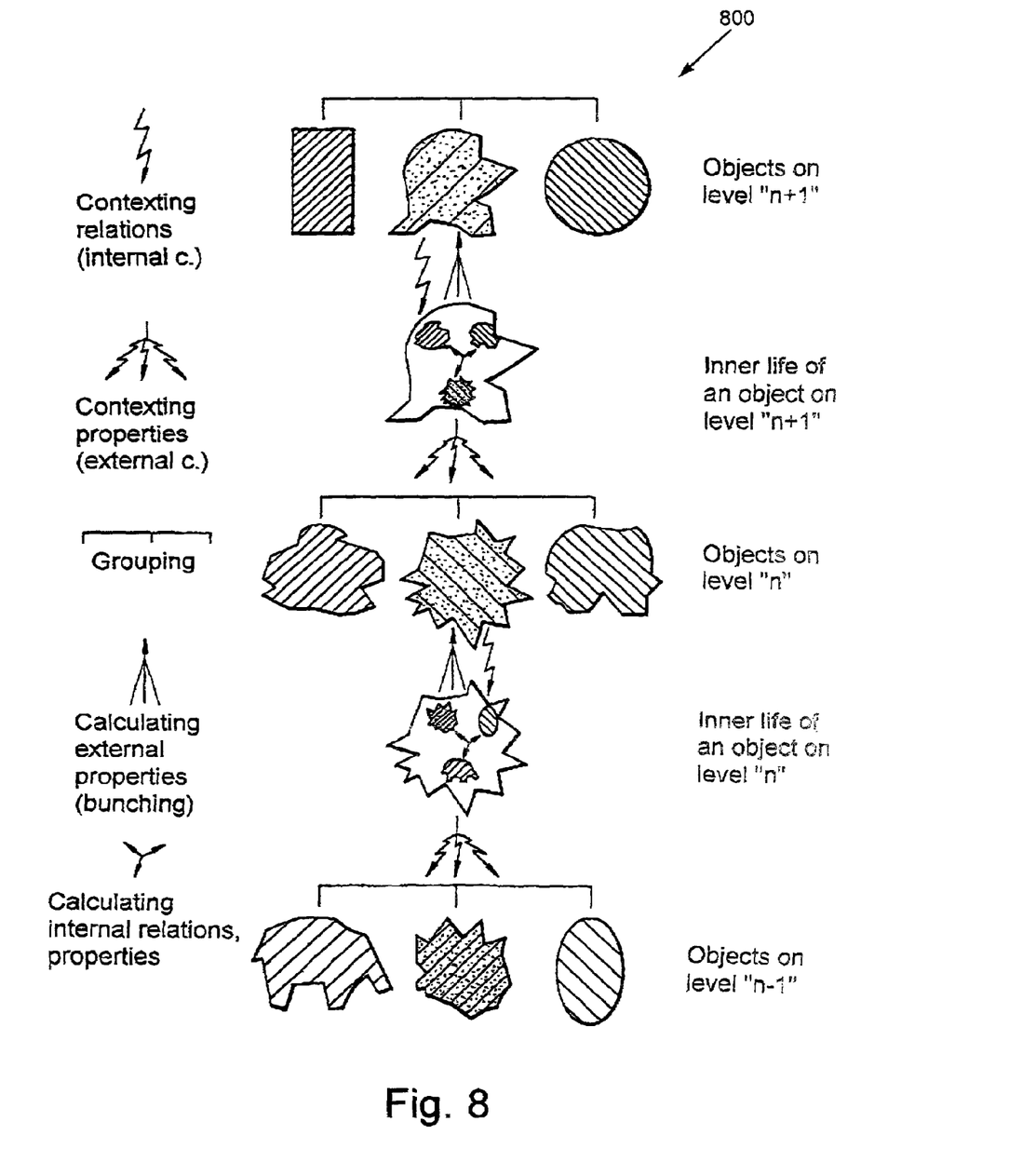
FIG. 8 illustrates a simplification achieved by the introduction of internal and external characteristics and internal and external boundary conditions.

The invention shall in the following be explained in more detail by referring to the description of two examples, with the second example being additionally represented in FIG. 8.

The first example of the invention is an automatic object recognition and object identification in the case of satellite pictures.

Satellite pictures have hitherto been evaluated by manually inputting respective identified objects. This increasingly requires human workforce, something presumably neither manageable nor affordable in the future in view of the dramatically increasing flood of data. The method performed along the principles of the invention, in contrast, is sufficiently intelligent for automatically recognizing objects to thereby do away with the need for human intervention.

In a first step, the entire satellite picture is roughly split into large objects in a conventional manner. The satellite picture may be an electronic image. Splitting may be performed by pixel averaging and a subsequent determination of color similarity. Even the best conventional methods are not capable of error-free object recognition, not to mention object identification. As a rule, parts of the objects will be left out of the division, or parts not pertaining to the object will be included. This is not a major stumbling block in the first step of the method according to the invention as the recursion will later on correct the error. The (erroneously) found objects are now in turn sub-divided, in accordance with the same method, into subordinate objects which are in turn sub-divided into subordinate objects etc., until the level of the pixel has been reached.

Subsequently the objects are arranged in the hierarchical tree structure found in this manner such as than seen in FIG. 1.

The next step is fractal-hierarchical bunching (the interactions are calculated later on once the objects have been roughly identified).

First, characteristics may be assigned to each object. The objects may be described by representative characteristic numbers of a statistical type. This may be the mean color value of the object, the variance of the color value, the ratio of surface and contour, the scale-dependent contour roughness, or even the number or size of subordinate objects. This process is performed on each object for all hierarchy levels.

Next, a hierarchical library having objects that are structured and characterized by the same characteristic numbers as for the objects of the complex system being analyzed. For example, a hierarchical library which may be employed in many or all satellite picture recognition applications can be used. In this hierarchical library the landscape is classified into rough areas, these latter ones in turn into more minute ones, etc. It is, for instance, possible to classify the landscape into inhabited and uninhabited areas. The inhabited areas are classified into thinly and densely inhabited ones, such as e.g. towns and cities. The cities are in turn sub-divided into city blocks, and these in turn into even more minute objects like apartment blocks and park facilities. An object in the complex system may have more than one reference to the hierarchical library. A tree, for example, is the subordinate object of a park, of a street of houses and of a forest.

Now, the initial identification of the objects is calculated. By comparison of the characteristic numbers of the fractal-hierarchical objects of the library on the one hand with the characteristic numbers of the fractal-hierarchical objects the complex system obtained in the first step on the other hand, one or several objects from the library are allocated to each object of the first step. This may be carried out in accordance with percentages of an identification probability "IP". An object of the first step may then e.g. be awarded a 30-% forest identification and a 70-% field identification. Thus, the initial characteristics and boundary conditions, i.e., the initial values, the initial characteristic numbers and the initial identification probability IP percentages have been determined.

Next, recursion is performed. The objects extracted from the picture are re-calculated recursively, namely with respect to their shape based on their characteristic numbers as well as with respect to their respective IP.

Next, recursive calculation of interactions within a group is performed. The (partnership) relations of the objects are determined. Herein the geometrical positions and shapes will play a role. Also, the distances, possibly including directions, size relations and geometrical similarities are determined.

Next, recursive bunching of group characteristics is performed. The symmetries (such as e.g. linear arrangements), the number of (similar) objects in the group, the average sizes of similar objects or the average distances or densities of objects and the like are determined. All IPs occurring in the group are processed statistically (e.g. how many of a particular type are there?).

Next, recursive contexting is performed. The relation between the group (as a superordinate object composed of group members) and the group members is determined. What percentage of the group surface or perimeter is occupied by the object? Do the IP's match (corresponding e.g. to the question in what probability an airport can be a subordinate object of a city). The information concerning the contexts of the objects within the library also form part of the library and are referred to for comparison.

Next, recursive re-calculation and grouping of the objects is performed. Each object is recursively recalculated with respect to its composition and its IP. Herein the results of bunching, of contexting and of the interaction (relation) calculations are additionally included. Where an object having several IP's with respect to the object's context better matches one of the possible identifications, those IP's with the better matches increases.

Those objects adjacent to the boundary of each group are re-grouped, depending on whether or not they better match the boundary objects of neighboring superordinate object. This modification requires a step four re-calculation of IP's and of operations of recursive calculation of interactions, recursive bunching and recursive contexting.

In the following, the second example shall be explained in more detail by referring to process 800 of FIG. 8. One feature of this embodiment is a clear simplification achieved by the introduction of internal and external characteristics, or internal and external contexting, i.e., boundary conditions.

At the outset a preliminary fractal-hierarchical object structure is formed. In this object structure, groups are combined into new objects. An example of this is discussed in connection with FIG. 1.

Each object in this preliminary fractal-hierarchical object structure has an identity. This identity consists of internal and external fractal-hierarchical identity. The internal identity consists of internal characteristic and internal context. The external identity consists of external characteristic and external context.

For better understanding, the following should be noted: internal properties of an object are not identical with the external properties of the subordinate objects. The internal properties consist of external properties of the subordinate objects and the relations, i.e., interactions, of the subordinate objects in the internal context. The internal context is not identical with the external context of the subordinate objects.

Calculation of the internal relations (partly also the bunching) correspond to a conventional simulation and are carried out accordingly in the described method according to the invention.

Following determination of the initial configuration, the identities of the fractal-hierarchical objects are re-calculated iteratively and recursively.

Calculation of identity is performed in detail as follows:

Recursion: the internal and external characteristics of the object must be re-calculated.

Internal characteristics: internal characteristics are calculated from the internal relations of the subordinate objects with their characteristics in the internal context.

External characteristics: external characteristics are calculated by bunching in the external context.

Internal context: The internal context is the boundary condition for the internal relations of the subordinate objects and is calculated from the external context of the subordinate objects and from their external properties.

External context: The external context is the boundary condition for calculation of the external characteristic (bunching) and is calculated from the internal relations of the superordinate object and their internal context.

An additional point: in calculating the identity of an object it is also possible to start algorithms for newly grouping or re-grouping. It is even possible to call up algorithms which re-determine the algorithms for bunching and contexting.

The identity of the objects is determined by the following criteria:

bunched characteristic (external characteristic);

internal relations of the subordinate objects (internal characteristic);

external, internal context;

algorithms for internal and external contexting and for determination of internal and external properties;

algorithms for re-grouping;

algorithms for modification of algorithms.

Through its identity the object provides an input concerning its external properties in an upward direction, whereby the internal and external identity of the superordinate object may be recalculated. In a downward direction the object provides its input concerning the internal contexting as well as the internal grouping for calculation of the identity of the subordinate objects.

While preferred embodiments of the present invention have been shown and described, it will be understood that there is no intent to limit the present invention by such disclosure but rather it is intended to cover all modifications falling within the spirit and scope of the present invention as defined in the appended claims.

What is claimed is:

1. Computer-implemented method for characterizing a complex system, wherein said complex system consists of a plurality of objects and wherein relations are present between said objects, said method comprising:
    (a) forming a hierarchical structure having a plurality of hierarchical levels, wherein an initial complex system includes input data to be evaluated and wherein superordinate objects of a respective higher hierarchical level of the hierarchical structure are combinations of objects of a respective lower hierarchical level of the hierarchical structure, wherein a characteristic and a boundary condition is assigned to each of said objects within the hierarchical structure;
    (b) forming groups of objects which belong to the same superordinate object of a respective higher hierarchical level;
    (c) determining relations between objects in each respective group by taking into account the respective boundary conditions of the objects within the respective group;
    (d) determining at least one characteristic for each group based on the determined relations between objects within a respective group while taking into account the respective boundary conditions of the objects within the respective group in order to describe a superordinate object;
    (e) determining boundary conditions for each object of a respective group based on the characteristic of an superordinate object which represents the respective group;
    (f) modifying the objects in accordance with the determined characteristics and boundary conditions; and
    (g) iterative repeating steps (b) to (f) until a predetermined condition is met to form a final complex system.

2. The method of claim 1, wherein the highest hierarchical level of the hierarchical structure is represented by a single object.

3. The method of claim 1, wherein in forming the hierarchical structure an algorithm is used.

4. The method of claim 3, wherein the algorithm is a fractal algorithm and is employed in a similar manner for all objects within the hierarchical structure.

5. The method of claim 1, wherein determining at least one characteristic for each group is based on a rising order of hierarchy level while proceeding on a fractal manner.

6. The method of claim 5, wherein determining at least one characteristic for each group includes calculating according to a fractal algorithm.

7. The method of claim 1, wherein determining boundary conditions for each object of a respective group includes determining in a descending order of hierarchy level while proceeding in a fractal manner.

8. The method of claim 7, wherein proceeding in a fractal manner includes splitting in accordance with fractal algorithms, wherein splitting in accordance with fractal algorithms includes at least one of classifying into sub-topics, classifying into more specific boundary conditions, splitting resources and distributing resources.

9. The method of claim 1, wherein determining at least one characteristic for each group is performed before determining boundary conditions for each object of a respective group.

10. The method of claim 1, wherein determining at least one characteristic of each group is performed after determining boundary conditions for each object of a respective group.

11. The method of claim 1, wherein determining relations between objects in a respective group, determining at least one characteristic for each group and calculating boundary conditions for each object of a respective group are each performed according to an algorithm, wherein each algorithm includes factors of neighboring objects, subordinate objects and boundary relations.

12. The method of claim 11, wherein each algorithm modifies respective objects based on at least one of the current status, the neighboring objects, the context and the subordinate objects.

13. The method of claim 1, further comprising the step of performing object recognition having the form of a self-optimizing simulation.

14. The method of claim 13, wherein performing object recognition includes employing a fractal-hierarchical library.

15. The method of claim 1, wherein each characteristic is classified into one of an internal characteristic and an external characteristic and wherein each boundary condition is classified into one of a internal boundary condition and an external boundary condition.

16. The method of claim 15, wherein the internal characteristics are determined in an internal context from internal relations of the subordinate objects with their characteristics.

17. The method of claim 16, wherein the internal context constitutes the boundary condition for the internal relations of the subordinate object and is determined from an external context of the objects and their external characteristics.

18. The method of claim 17, wherein the external characteristics are calculated by bunching in the external context.

19. The method of claim 18, wherein the external context constitutes the boundary condition for determining the external characteristic and is calculated from Internal relations of the superordinate object and its internal context.

20. The method of claim 1, wherein the complex system is a satellite picture.

* * * * *

UNITED STATES PATENT AND TRADEMARK OFFICE
CERTIFICATE OF CORRECTION

PATENT NO. : 7,117,131 B2  Page 1 of 1
APPLICATION NO. : 09/850928
DATED : October 3, 2006
INVENTOR(S) : Gerd Binnig It is certified that error appears in the above-identified patent and that said Letters Patent is hereby corrected as shown below:

On Title page item 73 should read (A) Name of Assignee(s)

1) DEFINIENS AG (B) Residence (city and State or country)

1) MUCHEN, FED REP GERMANY

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,117,131 B2 |
| APPLICATION NO. | : 09/850928 |
| DATED | : October 3, 2006 |
| INVENTOR(S) | : Gerd Binnig |

It is certified that error appears in the above-identified patent and that said Letters Patent is hereby corrected as shown below:

Title Page item 73 insert (A) Name of Assignee(s)

2) INTERNATIONAL BUSINESS MACHINES CORPORATION (B) Residence (city and State or country)

2) ARMONK, NEW YORK

Signed and Sealed this

Sixteenth Day of September, 2008

JON W. DUDAS
*Director of the United States Patent and Trademark Office*